Jan. 5, 1943. A. K. WOLFE 2,307,315
TIME DELAYED REDUCED VOLTAGE CONTROL CIRCUIT
Filed Feb. 3, 1941 2 Sheets-Sheet 1
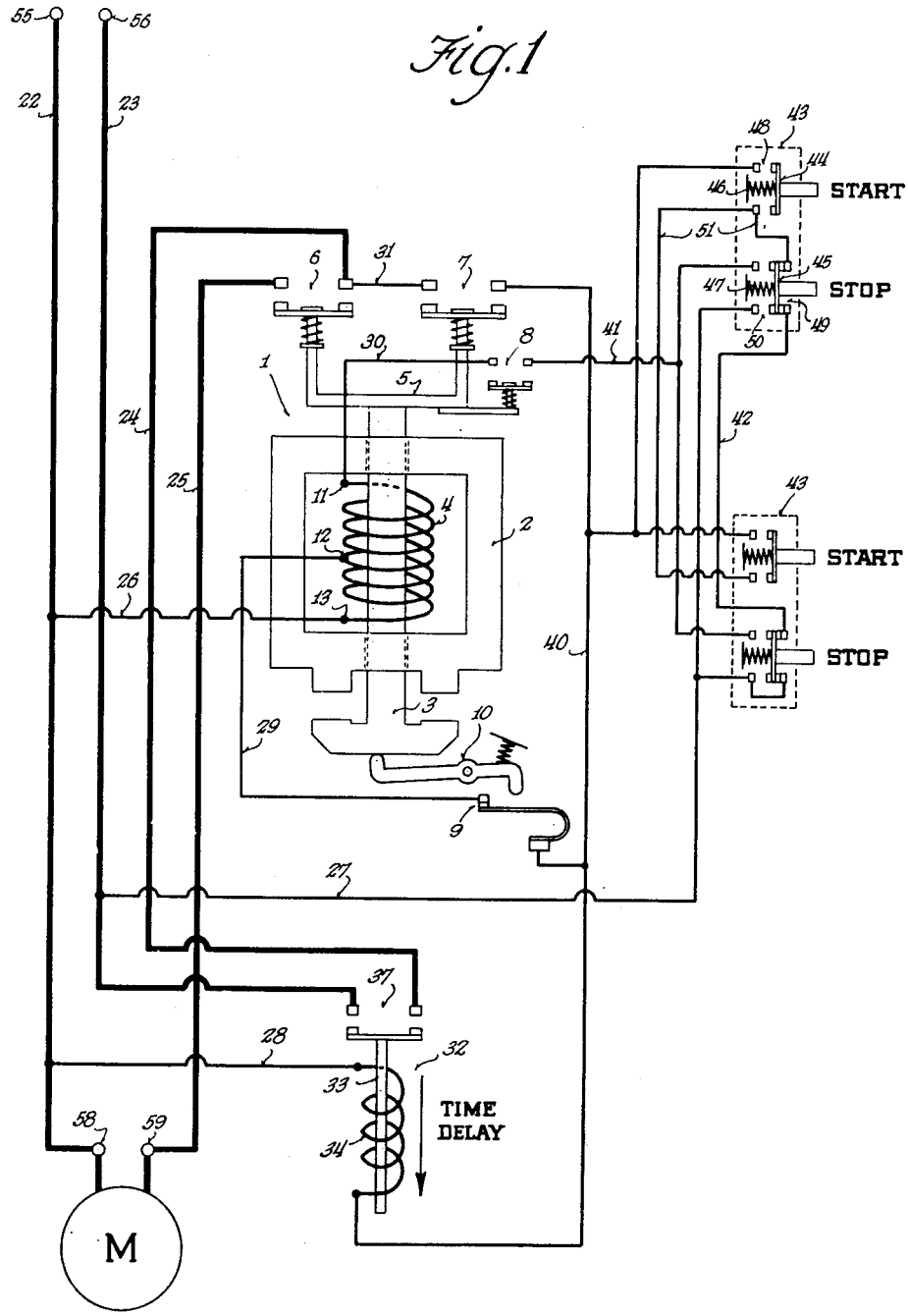
INVENTOR.
ALLEN K. WOLFE
BY Walter S. Pfeifer
ATTORNEY.

Jan. 5, 1943.    A. K. WOLFE    2,307,315
TIME DELAYED REDUCED VOLTAGE CONTROL CIRCUIT
Filed Feb. 3, 1941    2 Sheets-Sheet 2
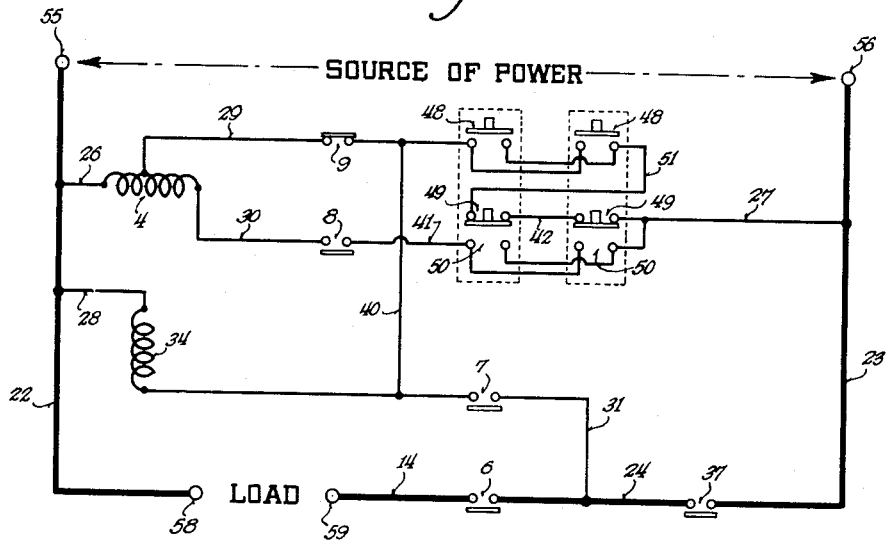
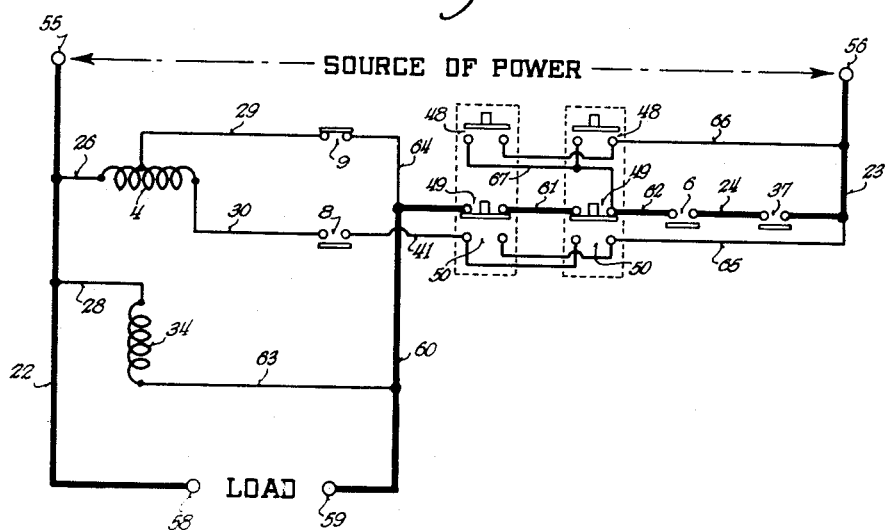
INVENTOR.
ALLEN K. WOLFE
BY Walter S. Pfiefer
ATTORNEY.

Patented Jan. 5, 1943

2,307,315

UNITED STATES PATENT OFFICE 2,307,315

TIME DELAYED REDUCED VOLTAGE
CONTROL CIRCUIT

Allen K. Wolfe, Milwaukee, Wis., assignor to Allen-Bradley Company, Milwaukee, Wis., a corporation of Wisconsin Application February 3, 1941, Serial No. 377,186

14 Claims. (Cl. 175—294)

This invention relates to an improved time delayed reduced voltage control circuit.

The object of this invention is to secure a time delayed reduced voltage control circuit that can be controlled in the usual manner from one or more remote points by means of conventional "start" and "stop" control stations.

A further object of this invention is to secure an improved time delayed reduced voltage control circuit that is simple and reliable in its operation and susceptible of a great variety of control applications.

A further object of this invention is to include in a time delayed reduced voltage control circuit a relay having two alternative maintained positions in combination with a time delayed voltage responsive relay to maintain the connection of the load to the source during periods of reduced voltage and connections to permit the circuit to be controlled from one or more points by "start" and "stop" control stations of usual design.

In certain control circuits it is advantageous to have the circuit remain in or automatically return to the operative position in the event of a voltage dip or interruption of power for a short period of time. One application for a circuit of this type is the control of electric motors driving loads having high inertia.

Electric motors operating under conditions of high inertia can have the power supply reduced or interrupted for short periods of time without being disconnected from the power supply as is the usual practice in circuits having reduced or no voltage protection. In control applications of this type, it is advantageous to have a control circuit that remains in the operative position for the short period of reduced voltage during which the motor can safely remain connected to the source of power without operation of the starting control station.

The invention herein disclosed shows an improved circuit arrangement whereby time delayed reduced voltage control is obtained in a simple and reliable manner without resorting to the use of complicated control stations or a multiplicity of time delayed reduced voltage relays. The control circuit illustrative of the arrangement whereby the objects of this invention are obtained is shown on the attached drawings forming a part of this specification.

Figure 1 is the control circuit showing the operation of the preferred form of this invention.

Figure 2 is a line diagram showing the circuit connections of the control system shown in Figure 1.

Figure 3 is a line diagram showing the connections for an alternative form of the control system shown in Figure 1.

The preferred form of the invention shown in Figure 1 is a control circuit operable from one or more start and stop control stations 43 to connect an electric load, shown in this diagram as an electric motor M, to a source of electric power. The control circuit includes a two-position relay 1, a time delay relay 32 and two control stations 43.

The two-position relay 1 shown in the preferred form, is a relay of the type disclosed in the pending application of Gustav O. Wilms and Albert J. Dawe for "Electromagnetically operated devices," Serial Number 315,040, filed January 22, 1940. This relay includes a fieldpiece 2 and cooperating armature 3 that is moved to closed or open positions by means of switch coil 4. The movement of the armature 3 to either open or closed positions operates switches 6, 7, 8 and 9. Switches 6, 7 and 8 are operated by the switch actuator assembly 5 attached to the top of the armature 3. Switch 9 is operated by the spring biased lever mechanism 10 coupled to the bottom of armature 3.

In the normal or open position shown in Figure 1, switches 6, 7 and 8 are open and are designated "normally open," switch 9 is closed and is designated "normally closed." When the armature 3 moves to the closed position, switches 6 and 7 close before switch 8 closes and switch 9 opens. This is obtained by properly spacing the contacts as shown in Figure 1.

The two-position relay 1 is held in the open position by the weight of the armature 3 and attached parts. Movement of the armature 3 to the closed position is obtained by operating one of the "start" means 44 thus energizing the portion of the switch coil 4 between terminals 12 and 13. As the armature 3 engages fieldpiece 2, the energized portion of the coil 4 is de-energized by the opening of switch 9 and the armature 3 remains in engagement with fieldpiece 2 by virtue of the residual magnetism remaining in the magnetic circuit. The two-position relay 1 is moved from the closed position to the open position by operating one of the "stop" means 45 thus energizing the entire switch coil 4 with a demagnetizing force just sufficient to reduce the residual magnetism in the magnetic circuit to a value that will allow armature 3 to drop to the open position.

A timing relay 32 cooperates with the two-position relay 1 to connect the load to the source of electric power. The timing relay 32 employed in this circuit is of the type that is electromagnetically actuated to the closed circuit position and upon deenergization or a predetermined reduction in energization having a time delay means responsive to delay its return to the open circuit position. The time delay relay 32 is moved to closed circuit position by energizing coil 34 moving actuator 33 to a position to close switch 37. This switch remains closed as long as coil 34 remains properly energized. Upon predetermined reduction of energization of coil 34, the return of actuator 33 to its normal position is delayed for a definite period of time as long as such change in energization of coil 34 persists. Upon the expiration of the time period, switch 37 returns to the open circuit position.

One or more control stations 43 can be used to control the operation of the two relays employed in this control circuit. Each control station 43 used is identically the same and each includes a start means 44 and a stop means 45. The start means 44 consists of a normally open switch 48 held in the open position by means of spring 46. Upon compression of spring 46, switch 48 is moved to the closed position. The stop means 45 includes a normally closed switch 49 and a normally open switch 50 held in their normal positions by spring 47. Upon compression of spring 47, normally closed switch 49 moves to the open position and then normally open switch 50 moves to the closed position.

A source of electric power connected to terminals 55 and 56 is connected to an electric load connected to terminals 58 and 59 by means of the circuit shown in heavy black lines in Figures 1 and 2. This circuit includes conductors 22, 25, 24 and 23 and switches 6 and 37 in their closed positions. Upon operation of either start means 44, a circuit is completed from conductor 22 through conductor 26 to terminal 13 of switch coil 4, through a portion of coil 4 to terminal 12, through conductor 29, switch 9, a portion of conductor 40, switch 48 of start means 44 in its operated position, a portion of conductor 51 to a normally closed switch 49, conductor 42, a second normally closed switch 49, a portion of conductor 27 to conductor 23. This circuit connection energizes the portion of coil 4 between terminals 12 and 13 to move the two-position relay 1 to the closed position and simultaneously open switch 9 to de-energize coil 4 allowing armature 3 to remain in engagement with fieldpiece 2 by virtue of the residual magnetism remaining in the magnetic circuit.

Simultaneous with the movement of the two-position relay 1 to the closed position, a circuit is completed from conductor 22 through conductor 28, coil 34, a portion of conductor 40, switch 48 of start means 44 in its operated position, a portion of conductor 51 to a normally closed switch 49, conductor 42, a second normally closed switch 49, a portion of conductor 27 to conductor 23. This circuit connection energizes coil 34 of the time delay relay 32 to move the relay to the closed position. Movement of the two-position relay 1 and the time delay relay 32 to their respective closed positions closes switches 6 and 37 respectively, and completes the connection of the load to the source of electric power.

The closing of the two-position relay 1 closes switch 7 which provides a lock-in circuit for time delay relay 32. The lock-in circuit provides a connection from conductor 22 through conductor 28, coil 34, a portion of conductor 40, switch 7 in its closed position, conductor 31, conductor 24 and switch 37 in its closed position to conductor 23.

Coil 34 of the time delay relay 32 is so designed that upon a reduction of the voltage of the source of electric power below a minimum value, the relay is operative to return to its normal position upon the expiration of a definite period of time during which the condition of reduced voltage persists.

The purpose of this control circuit is to provide a circuit arrangement for connecting a load to a source of power and responsive upon occurrence of pre-determined reduced voltage conditions to maintain the connection for a definite period of time. During the occurrence of a condition of low voltage, the two-position relay in the closed position maintains circuit connections in cooperation with the time delay relay, whereby, the connection of the load to the source of power persists for a period of time independent of the operation of the control station. Upon occurrence of a condition of reduced voltage, after the expiration of the time delay period of the time delay relay 32, actuator 33 returns to the open position returning switch 37 to its open position disconnecting the load from the source of power. The two-position relay 1 remains in its closed position. Upon return of the voltage of the source of power to normal condition, the circuit can be operated by movement of a start means 44 which re-energizes coil 34 of the time delay relay closing switch 37 and restoring the circuit to its circuit connecting position.

In the event of a condition of reduced voltage occurring for a period of time, less than the time setting of relay 32, the circuit remains in the closed position. The time delay means of relay 32 is initiated upon occurrence of predetermined low voltage. Upon restoration of normal voltage before expiration of the time period, the time delay means is restored to its initial position thus requiring for each low voltage condition sufficient to disconnect the load from the source, substantial continuity of the low voltage condition for a period of time equal to or greater than the setting of the time delay relay 32.

Under conditions of normal voltage of the source of power, the load can be promptly disconnected from the source of power by operation of either of the stop means 45. Operation of stop means 45 first opens switch 49 rendering the start means ineffective. Upon closure of switch 50, a circuit is completed from conductor 22 through conductor 26, to terminal 13 of coil 4, through coil 4 to terminal 11 of coil 4, through conductor 30, switch 8 in its closed position, a portion of conductor 41, switch 50 in its closed position and a portion of conductor 27 to conductor 23. The energization of coil 4 is of such value as to reduce the residual flux in the magnetic circuit of fieldpiece 2 and armature 3 to such a value as to allow the armature 3 to return to its normal position.

The return of the two-position relay 1 to its normal position opens switch 6 disconnecting the load from the source and opens switch 7 of the lock-in circuit for the time delay relay 32. Upon expiration of the time delay period, actuator 33 of the time delay relay 32 will return to its normal position opening switch 37.

The operation of the control circuit shown in Figure 1 is more clearly shown in the line diagram given in Figure 2. In this diagram the essential circuit connections are shown in more simple form than that given in the wiring diagram of Figure 1. The essential elements of the two-position relay 1 comprising coil 4 and switches 6, 7, 8 and 9 are shown on this line diagram. The essential elements of the time delay relay 32 consisting of coil 34 and switch 37 are also shown in this line diagram. The two control stations are likewise shown in simplified form. Reference to this diagram will assist in tracing the connections of this control circuit.

It is possible to utilize the invention disclosed in Figures 1 and 2 in a number of modified forms, which modifications are determined by specific application of the invention in control work. Figure 3 shows one modification that can be used without departing from the inventive idea shown in Figures 1 and 2. This modification is only shown by means of a line diagram similar to that given in Figure 2. In the form shown in Figure 3, the two-position relay 1 is identical with that shown in Figure 1 except that switch 7 is not utilized. The timing relay 32 and one or more control stations 43 are the same as that shown in Figure 1 except for modifications in circuit connections. The connection of the load to the source of power is made by operation of switch 48 completing a circuit from conductor 22 through conductor 26, a portion of coil 4, conductor 29, switch 9, conductor 64, a portion of conductor 60, switch 49, conductor 61, a second switch 49, conductor 67, switch 48 in its closed position and through conductor 66 to conductor 23. The energization of this portion of coil 4 moves the two-position relay 1 to its closed position, closing switch 6 in the same manner as set forth above.

Simultaneously with the energization of a portion of coil 4, a circuit is completed from conductor 22, through conductor 28, coil 34, conductor 63, a portion of conductor 60, switch 49, conductor 61, a second switch 49, conductor 67, switch 48 in its closed position and through conductor 66 to conductor 23. The energization of coil 34 closes switch 37. The movement of the two relays to their respective closed positions connects the load to a source of power through conductor 22, conductor 60, switch 49, conductor 61, a second switch 49, conductor 62, switch 6 in its closed position, conductor 24, switch 37 in its closed position and conductor 23. The closing of the two relays also provides a lock-in circuit for the time delay relay 32 to hold it in the closed position independent of switch 48. The locking-in circuit provides a connection from conductor 22, through conductor 28, coil 34, conductor 63, a portion of conductor 60, switch 49 in its closed position, conductor 61, a second switch 49 in its closed position, conductor 62, switch 6 in its closed position, conductor 24, and through switch 37 in its closed position to conductor 23.

Upon occurrence of a pre-determined condition of reduced voltage of the source of power for a definite period of time, the time delay relay 32 returns to the open position opening switch 37, disconnecting the load from the source of power and opening the lock-in circuit for the time delay relay 32. Under this condition of reduced voltage, the two-position relay 1 remains in its closed position. If the condition of reduced voltage does not persist for the duration of the time period of the time delay relay 32, the connection of the load to the source of power is not broken and the lock-in circuit for the time delay relay remains effective. With the load connected to the source of power, operation of switch 49 disconnects the load from the source of power and interrupts the lock-in circuit for the time delay relay 32. Closing of switch 50 after opening of switch 49, completes a circuit from conductor 22 through conductor 26, coil 4, conductor 30, switch 8 in its closed position, conductor 41, switch 50 in its closed position, through conductor 65 to conductor 23. This connection energizes coil 4 to return the two-position relay 1 to its normal position in the manner set forth above. The return of the two-position relay 1 to its normal position, disconnects the load from the source of power and renders ineffective the lock-in circuit for the time delay relay.

The connection of the load to the source of power is usually made by means of an electromagnetically operated contactor or other switch device controlled by the time delayed reduced voltage circuit. In the form disclosed in Figures 1 and 2, the relays incorporated in the control circuit are used to directly connect the load to the source of power. The relays can also serve as a pilot control circuit to connect the load to the source of power. In the form shown in Figure 3, the connection of the load to the source of power is shown as made through contacts in the control station. This alternative form is usually employed as a pilot circuit for an electromagnetically operated contactor to connect the load to the source.

The time delayed reduced voltage control system herein disclosed can be operated from one or more control stations of usual design. Heretofore control circuits of this type have required control stations employing time delay devices and mechanical couplings between the "start" and "stop" means of the control station to secure the proper control functions. By the use of a maintained position relay in combination with a time delay reduced voltage relay and proper circuit connections, control stations of usual design can be used. In either form of the invention disclosed, the connections are such that one or more stations can be used with equal effectiveness.

The proper function of the circuit is obtained by providing a circuit equivalent to that provided by operation of the "start" means during the predetermined period of reduced voltage. This is, of course, true of other similar circuits heretofore used. The system herein disclosed shows a new and novel combination of circuit elements whereby this equivalent circuit is obtained.

I claim as my invention:

1. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position electromagnetic relay having means to move to "on" position, means to move to "off" position and means independent of the continuity of said source of power to maintain said two-position relay in either "on" or "off" position, and control connections to actuate said two relays to their "on" positions; said two relays in "on" position each having circuit means in series connecting the load to the source; and said series connection being maintained jointly by said two relays during periods of normal voltage and for a predetermined period of reduced voltage.

2. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, a control station having a "start" means and a "stop" means with said "start" means ineffective when said "stop" means is operated, and electrical connections, whereby, said two-position relay is controlled by the "start" and "stop" means to move respectively to "on" or "off" positions; said time delayed relay is controlled by the "start" means to move to "on" position; said two relays in their "on" positions each having circuit means in series connecting the load to the source and maintaining such connection during periods of normal voltage and for a period of time after occurrence of a predetermined low voltage condition of said source; and said "stop" means is effective to disconnect the load from the source at any time during which said power source is effective.

3. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source returning from said "on" position to "off" position, a two-position relay having means to move to "on" position, means to move to "off" position, residual magnetic means holding said two-position relay in "on" position, and means to render said residual magnetic means ineffective to permit the return of said two-position relay to "off" position, and control connections, whereby, said two relays are energized by said source of power to move to their "on" positions to jointly connect the load to the source, maintaining such connection by said residual magnetic means during periods of normal voltage of said source and for a period of time upon occurrence of a predetermined low voltage condition.

4. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, and a "start" means actuating a second relay to "on" position to effect connection of the time delayed relay to the source of power to move said time delayed relay to "on" position and said two relays jointly connecting the load to the source; said second relay in "on" position providing a residual magnetically maintained lock-in circuit for the time delayed relay to maintain connection with the source of power independent of said "start" means; and a "stop" means to return said second relay from "on" position to "off" position.

5. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move circuit connecting means to "on" position, and upon occurrence of a predetermined low voltage time condition of the source returning said circuit connecting means from said "on" position to "off" position, and a two-position relay having means to move a second circuit connecting means to "on" position, means to move said second circuit connecting means to "off" position and means independent of the continuity of said source of power to hold said second circuit connecting means in either "on" or "off" position; said two relays having their circuit connecting means in "on" position jointly connecting the load to the source by series connection and maintaining such connection during periods of normal and reduced voltage, whereby, movement of either relay to "off" position disconnects the load from the source.

6. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move circuit connecting means to "on" position, and upon occurrence of predetermined low voltage time condition of the source returning said circuit connecting means from said "on" position to "off" position, and a two-position relay having means to move a second circuit connecting means to "on" position, means to move said second circuit connecting means to "off" position and means independent of the continuity of said source of power to hold said second circuit connecting means in either "on" or "off" position; said two relays having their circuit connecting means in "on" position jointly connecting the load to the source by series connection and maintaining such connection during periods of normal and reduced voltage, whereby, movement of either relay to "off" position disconnects the load from the source; and the circuit connecting means of the two-position relay in "on" position, maintaining the connection of the time delayed relay to the source, whereby, movement of the two-position relay to "off" position disconnects the time delayed relay from the source.

7. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, a control station having a "start" means and a "stop" means, and connections, whereby, said "start" means controls the operation of said two relays to their "on" positions to effect series connection of switch means of each relay to jointly connect the load to the source and to maintain said series connection during periods of normal and reduced voltage; said "stop" means controls the operation of the two-position relay from "on" to "off" position; and movement of either relay to "off" position disconnects the load from the source.

8. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, a control station having a "start" means and a "stop" means, and connections, whereby, said "start" means controls the operation of said two relays to their "on" position to effect series connection of switch means of each relay to jointly connect the load to the source and to maintain said series connection during periods of normal and reduced voltage; said two relays in their "on" positions jointly maintain connection of the time delayed relay to the source of power; and said "stop" means controls the operation of the two-position relay from "on" to "off" position to disconnect the time delayed relay from the source and to disconnect the load from the source.

9. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, a control station having a "start" means and a "stop" means, and connections, whereby, said "start" means controls the operation of said two relays to their "on" positions to effect series connection of switch means of each relay to jointly connect the load to the source and to maintain said series connection during periods of normal and reduced voltage; said time delayed relay disconnects the load from the source after continuance of a predetermined low voltage condition; and said "stop" means controls the operation of said two-position relay to its "off" position to disconnect the load from the source during periods of normal voltage.

10. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, a control station having a "start" means and a "stop" means, and connections, whereby, said "start" means controls the operation of said two relays to their "on" positions to effect series connection of switch means of each relay to jointly connect the load to the source and jointly maintain said series connection independent of the "start" means during periods of normal voltage of the source of power and for a period of time after occurrence of a predetermined low voltage condition of the source of power; and said "stop" means controls the operation of said "start" means and the operation of the two-position relay to its "off" position to disconnect the load from the source during periods of normal voltage.

11. In a control circuit for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source returning from said "on" position to "off" position, a two-position relay having means to move to "on" position, means to move to "off" position and means independent of the continuity of said source of power to maintain said two-position relay in either "on" or "off" position, a control station having a "start" means and a "stop" means, and connections, whereby, said "start" means controls the operation of said two relays to their "on" positions to jointly connect the load to the source and jointly maintain such connection by series connected switch means associated with each relay; said two relays in their "on" positions jointly maintain connection of the time delayed relay to the source of power; said time delayed relay moves from "on" to "off" position interrupting said series connection to disconnect the load from the source after continuance of a predetermined low voltage condition; and operation of said "stop" means disconnects the load from the source and renders said circuit inoperative until after operation of said "start" means.

12. In a control circuit, operable from one or more control stations, for connecting an electric load to a source of electric power and maintaining such connection for a definite period of time upon the occurrence of a reduction of voltage of the source below a minimum value, the combination of a time delayed voltage relay responsive when connected to the source of power to move to "on" position and, upon occurrence of a predetermined low voltage time condition of the source, returning from said "on" position to "off" position, a two-position relay having means to move to "on" position, means to move to "off" position and means independent of the continuity of said source of power to maintain said two-position relay in either "on" or "off" position, control stations each having a "start" means and a "stop" means, and connections, whereby, said "start" means are connected in parallel to control the operation of said two relays to their "on" positions to effect series connection of switch means of each relay to jointly connect the load to the source and to maintain said series connection during periods of normal or reduced voltage; said "stop" means jointly control the operation of said "start" means; and said "stop" means having auxiliary means connected in parallel to control the operation of said two-position relay to "off" position after rendering said "start" means ineffective.

13. An electric control circuit comprising, a source of electric power, an electric load to be connected to said source of power, a two-position relay having means to move to "on" position, means to move to "off" position and means independent of the continuity of said source of power to maintain said two-position relay in either "on" or "off" position, a time delayed voltage relay responsive when connected to the source of power to move to "on" position and, upon occurrence of a predetermined low voltage time condition of the source, returning from said "on" position to "off" position, one or more control stations each having a means to "start" and a means to "stop" and connections, whereby, operation of any "start" means initiates the movement of the two relays to their "on" positions to effect series connection of switch means of each relay to jointly connect the load to the source, said two relays in their "on" positions jointly maintaining said series connection independent of the "start" means and upon occurrence of predetermined low voltage of said source said two relays in their "on" positions jointly maintaining said series connection for a definite period of said low voltage; and operation of any "stop" means renders said "start" means ineffective and initiates the movement of the two-position relay to its "off" position disconnecting the load from the source.

14. An electric control circuit comprising, a source of electric power, an electric load to be connected to said source of power, a two-position relay having means to move to "on" position, means to move to "off" position and means independent of the continuity of said source of power to maintain said two-position relay in either "on" or "off" position, a time delayed voltage relay responsive when connected to the source of power to move to "on" position and, upon occurrence of a predetermined low voltage time condition of the source, returning from said "on" position to "off" position, a plurality of control stations each having a means to "start" and a means to "stop" and connections, whereby, said "start" means are connected in parallel; said "stop" means have means connected in series and means connected in parallel with said series connected means operable before operation of the parallel connected means; operation of any "start" means initiates the movement of the two relays to their "on" positions to effect series connection of switch means of each relay to jointly connect the load to the source, said two relays in their "on" positions jointly maintaining said series connection independent of the "start" means and upon occurrence of predetermined low voltage of said source said two relays in their "on" positions jointly maintaining such connections for a definite period of said low voltage; and operation of any "stop" means renders said "start" means ineffective and initiates the movement of the two-position relay to its "off" position disconnecting the load from the source.

ALLEN K. WOLFE.